(Model.)
J. E. FINLEY.
EXTENSION HANDLE.
No. 419,761. Patented Jan. 21, 1890.
Fig. 1.
Fig. 2.
Fig. 3.
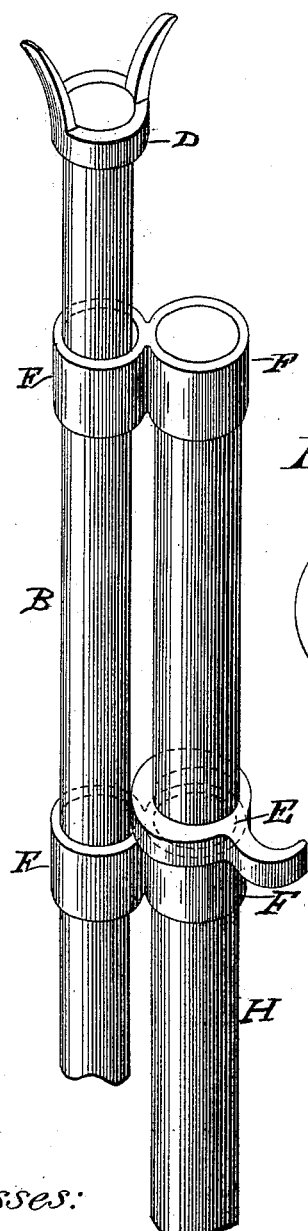
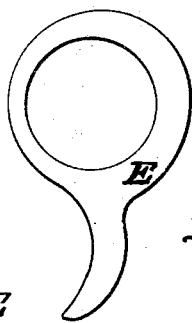
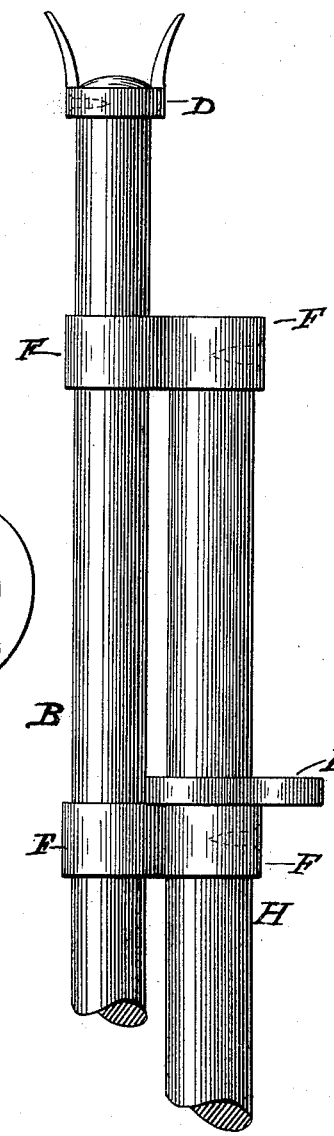
Witnesses:
J. P. Young
J. E. Trout
Inventor:
John E. Finley

UNITED STATES PATENT OFFICE.

JOHN E. FINLEY, OF MEMPHIS, TENNESSEE.

EXTENSION-HANDLE.

SPECIFICATION forming part of Letters Patent No. 419,761, dated January 21, 1890.

Application filed September 5, 1889. Serial No. 323,080. (Model.)

*To all whom it may concern:*

Be it known that I, JOHN E. FINLEY, a citizen of the United States, residing at Memphis, in the county of Shelby and State of Tennessee, have invented a new and useful Improvement in Extension-Handles, of which the following is a specification.

My invention relates to improvements in extension-handles, in which a handle is used in conjunction with a pair of twin ferrules firmly secured to the handle, and an eccentric encircles the handle in such a manner as to lock the second handle at any height desired, while on the end of this second handle is the forked ferrule having prongs, so that the same can be used for elevating or lowering objects in the room or store, and when this second handle is removed a broom or duster handle can be substituted, and the dust and spider-webs can be cleaned from the walls or ceiling of the room without the assistance of a ladder or other elevation, and when the handle is not in use the same can be telescoped, so as to occupy a small amount of space.

The objects of my improvements are, first, to provide a long handle, upon which I firmly secure the two twin ferrules with an eccentric encircling the handle in such a manner as to allow the elevating and lowering of the second handle with the forked ferrule, broom, or duster handle to be firmly held in any desired position by means of the eccentric encircling the handle, and, second, to furnish an extension-handle so arranged that any house broom or duster can be used in conjunction with this handle for the purpose of removing dust or other substances from the walls and ceilings of the rooms. I obtain these objects by means of the mechanism illustrated in the accompanying drawings, in which—

Figure 1 is a perspective view. Fig. 2 is a vertical section. Fig. 3 is a view of the eccentric which encircles the handle.

Similar letters refer to similar parts throughout all the views.

The twin ferrules F F are firmly secured to the handle H, and the eccentric E encircles the same, while the second handle B, with the forked ferrule D on the end, or the broom or duster handle, can be lowered or elevated at will and secured in position by means of the eccentric before referred to.

I claim as my invention and desire to secure by Letters Patent—

1. The handles, the pair of twin ferrules F F, secured to the handle H, and the eccentric E, encircling the same.

2. The combination of the handles, the twin ferrules F F, the eccentric E, and forked ferrule D.

JOHN E. FINLEY.

Witnesses:
J. E. FROST,
J. P. YOUNG.